(12) United States Patent
Waldorf et al.

(10) Patent No.: US 7,351,913 B2
(45) Date of Patent: *Apr. 1, 2008

(54) ANTI-ROOSTING DEVICE

(75) Inventors: Philip M. Waldorf, New Vernon, NJ (US); Heath A. Waldorf, Hoboken, NJ (US)

(73) Assignee: Bell Environmental Services, Inc., Parsipanny, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/187,919

(22) Filed: Jul. 25, 2005

(65) Prior Publication Data
US 2005/0263086 A1 Dec. 1, 2005

Related U.S. Application Data

(63) Continuation-in-part of application No. 10/780,600, filed on Feb. 19, 2004, now Pat. No. 6,933,446.

(51) Int. Cl.
*H01B 7/08* (2006.01)

(52) U.S. Cl. ..................... 174/117 F; 52/101

(58) Field of Classification Search ............ 174/117 F, 174/128.1; 119/903; 52/101
See application file for complete search history.

(56) References Cited

U.S. PATENT DOCUMENTS

| 817,448 | A | | 4/1906 | Shanahan | 817/448 |
|---|---|---|---|---|---|
| 877,442 | A | * | 1/1908 | Mast | 174/133 R |
| 2,647,228 | A | | 7/1953 | Just | 317/262 |
| 3,067,569 | A | | 12/1962 | Kelley | 57/242 |
| 3,291,897 | A | | 12/1966 | Bramley | 174/126.1 |
| 3,294,893 | A | | 12/1966 | Shaffer | 174/70 |
| 3,366,854 | A | | 1/1968 | Robinson | 317/262 |
| 3,504,892 | A | | 4/1970 | Crist | 256/10 |
| 3,717,802 | A | | 2/1973 | Plevy et al. | 317/262 S |
| 4,299,048 | A | | 11/1981 | Bayes | 43/98 |
| 4,861,645 | A | | 8/1989 | Standing | 428/196 |
| 4,861,947 | A | | 8/1989 | Altermatt et al. | 174/113 C |
| 4,862,637 | A | | 9/1989 | Dressel | 43/98 |
| 5,031,353 | A | | 7/1991 | Gardiner | 43/98 |
| 5,036,166 | A | | 7/1991 | Monopoli | 174/128.1 |
| 5,095,646 | A | | 3/1992 | Bunkers | 43/98 |
| 5,255,896 | A | | 10/1993 | Letarte et al. | 256/10 |
| 5,497,585 | A | | 3/1996 | Engler | 52/101 |
| 5,570,537 | A | | 11/1996 | Black et al. | 43/112 |
| 5,606,830 | A | | 3/1997 | Townsend, Jr. et al. | 52/101 |
| 5,713,160 | A | | 2/1998 | Heron | 52/101 |

(Continued)

FOREIGN PATENT DOCUMENTS

DE 3935340 * 10/1989

(Continued)

*Primary Examiner*—Chau N. Nguyen
(74) *Attorney, Agent, or Firm*—Bingham McCutchen LLP (57) ABSTRACT

An anti-roosting device is disclosed. The device includes a track, an electrical conductor, and an electrical source. The conductor is embedded within the track, with a portion of the conductor left exposed. The electrical source provides low amperage at high voltage to the electrical conductor such that the device is harmless to both birds and humans, but will deliver a shock that is effective in keeping birds from roosting thereon. The anti-roosting device may be provided in the form of a ledge or shade having a groove formed therein into which the track and other components are placed.

23 Claims, 5 Drawing Sheets

U.S. PATENT DOCUMENTS

| | | |
|---|---|---|
| 5,850,808 A | 12/1998 | Burdick .................. 119/903 |
| 5,992,828 A | 11/1999 | Burdick .................. 256/10 |
| 6,006,698 A | 12/1999 | Negre .................... 119/537 |
| 6,283,064 B1 | 9/2001 | Djukastein et al. ..... 119/713 |
| 6,341,550 B1 | 1/2002 | White ........................ 87/5 |
| 6,371,054 B1 | 4/2002 | Celata et al. ........... 119/712 |
| 6,472,602 B1 | 10/2002 | Pokrandt ................. 174/117 |
| 6,622,436 B1 | 9/2003 | Kretsch ................... 52/101 |
| 6,933,446 B1 * | 8/2005 | Waldorf et al. ......... 174/117 F |
| 2002/0066895 A1 | 6/2002 | Wildschut ................ 256/10 |

FOREIGN PATENT DOCUMENTS

| | | |
|---|---|---|
| EP | 1112686 | 7/2001 |
| JP | 2000-050786 | 2/2000 |
| WO | WO 95/08915 | 4/1995 |

* cited by examiner

ANTI-ROOSTING DEVICE

CROSS-REFERENCE TO RELATED APPLICATIONS

This patent is a continuation-in-part of U.S. Pat. application Ser. No. 10/780,600 filed on Feb. 19, 2004, now U.S. Pat. No. 6,933,446, which is incorporated herein by reference in its entirety.

BACKGROUND OF THE INVENTION

1. Field of the Invention

The present invention relates to a device for preventing birds and other pests from inhabiting and fouling an area. In particular, the present invention relates to an anti-roosting device.

2. Description of the Related Art

In many locations, the presence of birds is undesired, and even detrimental. For example, birds can interfere with the proper functioning of heating, cooling, and ventilation (HVAC) systems in commercial and residential buildings. The natural wastes associated with birds also frequently have adverse effects on people, equipment, and structures.

There are some known devices for preventing the roosting of birds in these areas. However, there is no known device that as effectively prevents the roosting of birds without detrimentally affecting the birds.

SUMMARY OF THE INVENTION

The present invention is related to an anti-roosting device to prevent birds from roosting near an object. The device includes a track, an electrical conductor, and an electrical source. The track is preferably elongate, sturdy, and flexible. The track may include one or more channels, in which one or more electrical conductors are embedded. A portion of the electrical conductors is left exposed, such that birds landing on the device will contact the electrical conductor. The channels are sized to snugly retain the conductors therein while leaving, preferably, approximately 1% to approximately 25% of the conductor exposed. A more preferred range of exposure is from approximately 10% to approximately 20%.

The channels are preferably substantially parallel to a longitudinal axis of the track. The track may have a flat side opposite the exposed electrical conductor(s) for facilitating attachment of the device to the object or area being protected. The track may be attached to the object by adhesive, such as glue or tape, between the object and the flat side. Mechanical fasteners, alone or in conjunction with the adhesive, may also be used. If mechanical fasteners are used, they are preferably connected through holes located in the track between the channels.

Each electrical conductor includes a plurality of wires around a rope. Preferably, the conductors include at least five wires around a rope. More preferably, the conductors include from five to ten wires around a rope, and most preferably the conductors include nine wires around a rope. The wires are electrically conductive, and the rope is not electrically conductive. The wires and rope may be braided, and are preferably circular in cross-section with substantially the same diameter. Preferred diameters are within the range of approximately 0.02 inch to approximately 0.03 inch, inclusive. The electrical conductors may be generally circular in cross-section and have a diameter of approximately 0.125 inch to approximately 0.175 inch.

The electrical source is operatively connected to the electrical conductor to provide electricity thereto. The electrical source is designed to provide low amperage at high voltage to the electrical conductor such that the device is harmless to both birds and humans, but will deliver a shock that is effective in keeping birds from roosting thereon. Preferred ranges include approximately 3 to approximately 6 amps at approximately 4000 to approximately 8000 volts. The electrical source may be either a direct current source or an alternate current source.

The anti-roosting device may be used in conjunction with sun shades, fins, ledges, etc. that are often used on the outer surfaces of buildings. These structures are provided with one or more grooves on one or more surfaces into which the anti-roosting devices are placed. These grooves are dimensioned to snugly retain the anti-roosting devices therein. These sun shades, fins, ledges, etc. are then positioned on the building as desired and the anti-roosting devices prevent birds and other creatures from inhabiting thereon.

DESCRIPTION OF THE DRAWINGS

The present invention is described with reference to the accompanying drawings, in which like reference characters reference like elements, and wherein.

DETAILED DESCRIPTION OF THE INVENTION

Figures 1, 2, 3:
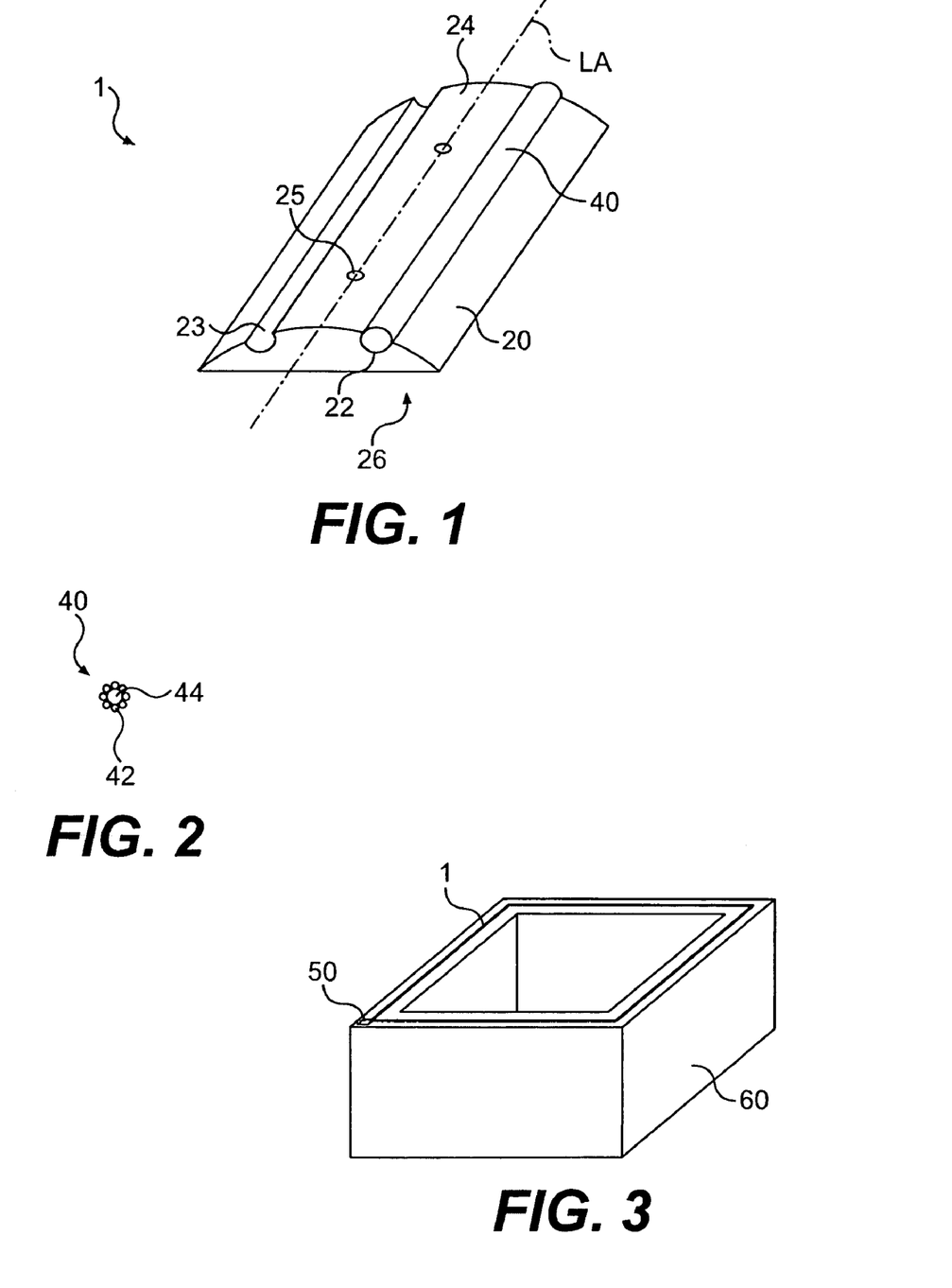
FIG. 1 shows an anti-roosting device according to the present invention.
FIG. 2 shows a detailed, cross-sectional view of an electrical conductor of the anti-roosting device of FIG. 1.
FIG. 3 shows the anti-roosting device of FIG. 1 in use.

FIG. 1 shows an anti-roosting device 1 according to the present invention. Device 1 includes an elongate track 20 and an electrical conductor 40. Track 20 is preferably comprised of a sturdy, flexible material. Furthermore, track 20 is preferably made of a non-conductive material. A preferred material for track 20 is polyethylene. Track 20 includes at least one channel 22 sized to at least partially embed electrical conductor 40 therein, while leaving a portion of conductor 40 exposed.

FIG. 2 shows a detailed, cross-sectional view of electrical conductor 40. As illustrated, a preferred embodiment of conductor 40 includes a plurality of wires 42 around a rope 44. Wires 42 and rope 44 may be braided. Electrical conductor 40 preferably includes at least five wires 42 around rope 44, and more preferably from five to ten wires 42. A most preferred embodiment includes nine wires 42 around rope 44. Rope 44 is preferably made of a substantially nonconductive material, such as polyethylene, and wires 42 are made of a conductive material, such as tinned copper and stainless steel. Wires 42 and rope 44 are preferably circular in cross-section and may have substantially the same diameter. Preferred diameters are within the range of approximately 0.02 inch to approximately 0.03 inch, inclusive.

Electrical conductor 40 preferably is generally circular in cross-section and has a diameter of approximately 0.125 inch to approximately 0.175 inch. Channel 22 is sized to snugly retain conductor 40 therein while leaving a portion of conductor 40 exposed such that birds landing on device 1 will contact electrical conductor 40 and receive a shock. A preferred amount of exposure is from approximately 1% to approximately 25% of conductor 40, and a more preferred amount of exposure is from approximately 10% to approximately 20% of conductor 40. These percentages may be measured as a percentage of the outer surface area or outer diameter of conductor 40.

Device 1 preferably includes a second channel 23 for embedding a second electrical conductor 40. Channels 22, 23 are substantially parallel to a longitudinal axis LA of track 20. A region 24 of track 20 intermediate channels 22, 23 may define a plurality of holes 25 for facilitating attachment of device 1 to the object or area being protected. Track 20 also preferably includes a flat side 26 opposite exposed electrical conductor(s) 40 for facilitating attachment of device 1 to the object or area being protected.

Device 1 further includes an electrical source 50 operatively couple to electrical conductor 40. Electrical source 50 is designed to provide low amperage at high voltage to said electrical conductor such that device 1 is harmless to both birds and humans, but will deliver a shock that is effective in keeping birds from roosting thereon. Preferably, electrical source 50 provides approximately 3 to approximately 6 amps at approximately 4000 to approximately 8000 volts to said electrical conductor. Electrical source 50 may be either a direct current source or an alternate current source. Electrical source 50 may additionally include a combination of both direct current and alternate current components, which may be beneficial in providing a backup power source in the event of a loss of power.

FIG. 3 shows anti-roosting device 1 attached to an object 60 to prevent birds from roosting thereon. Object 60 may be anything or any area around which bird presence is undesired, such as ledge, duct, or parapet. Track 20 is coupled to object 60 around the area to be protected. Track 20 may be coupled by adhesive, such as glue or tape, between object 60 and flat side 26. Mechanical fasteners, alone or in conjunction with the adhesive, may also be used to couple device 1 to object 60. If mechanical fasteners are used, they are preferably connected through holes 25. Electrical source 50 is operatively coupled to electrical conductor 40, and a current is provided to prevent birds from roosting on object 60.

Architects, building construction specialists, facilities managers, and the like often install sun shades on buildings as a means of reducing the heating effect of sun light, thereby reducing costs associated with maintaining the interior space at desired temperature levels. These devices, which are also known as ledges or fins and are generically referred to herein as "sun shades," may also be included merely for aesthetic purposes. These structures are typically mounted on the exterior of the building, possibly near a window or other opening in such a position as to block at least some of the sun's rays from entering the building. The anti-roosting device of the present invention may be used in conjunction with such sun shades to prevent birds and other creatures from roosting upon and fouling these structures.

Figure 4:
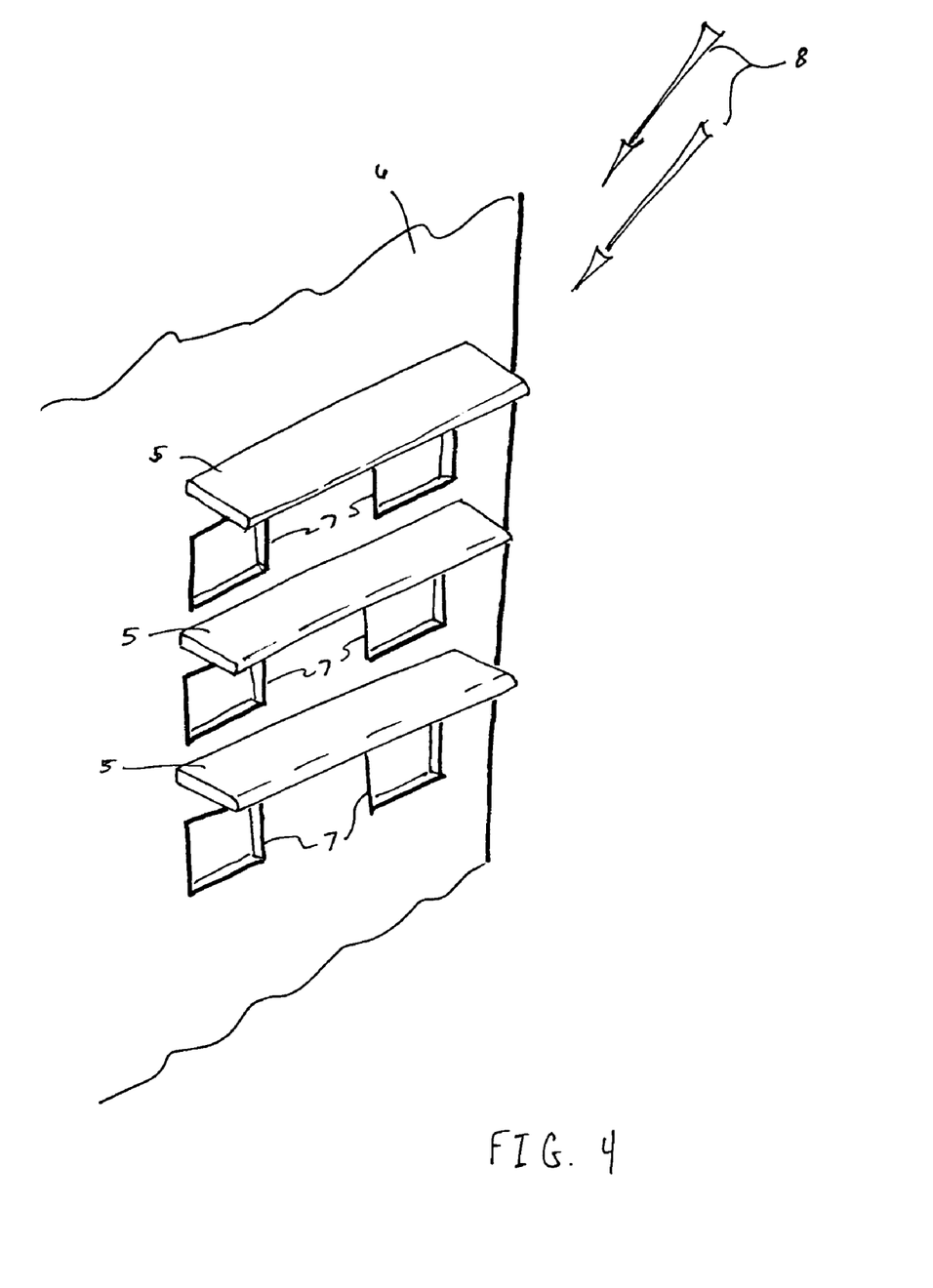
FIG. 4 shows a building onto which a plurality of sun shades have been affixed.

FIG. 4 shows a plurality of ledges or sun shades 5 for use with a building 6. While a high rise building typical of those found in large, metropolitan cities is illustrated in the exemplary setup of FIG. 4, the sun shade 5 may be used on any building. The sun shades 5 are mounted in known fashion to the building 6 near its windows 7. The sun shades 5, which may be provided in a variety of shapes and sizes, may be positioned such that they block at least some of the sun's rays, which are represented by arrows 8. The amount of sunlight that is blocked by the sun shades 5 will depend, among other factors, upon the time of day and the season of the year.

Figure 5:
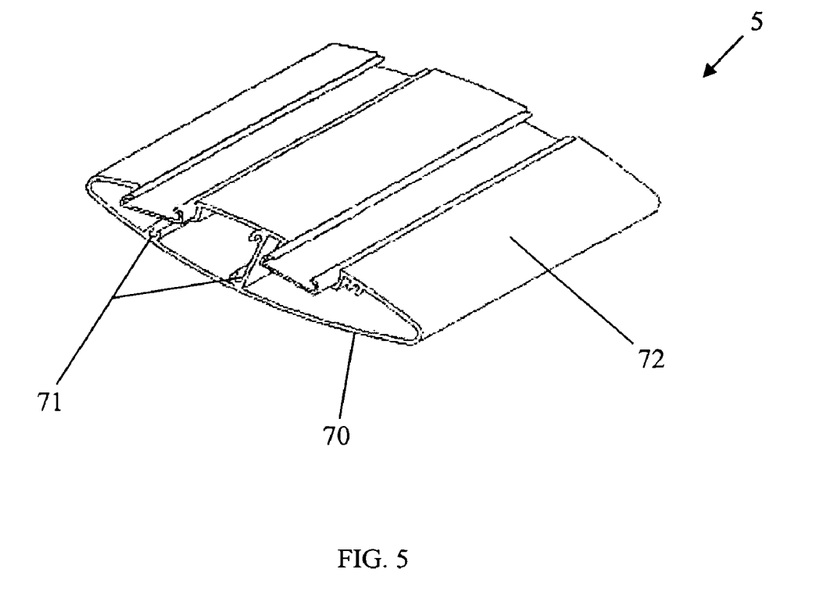
FIG. 5 shows an isomeric view of a preferred form of sun shade.
Figure 6:
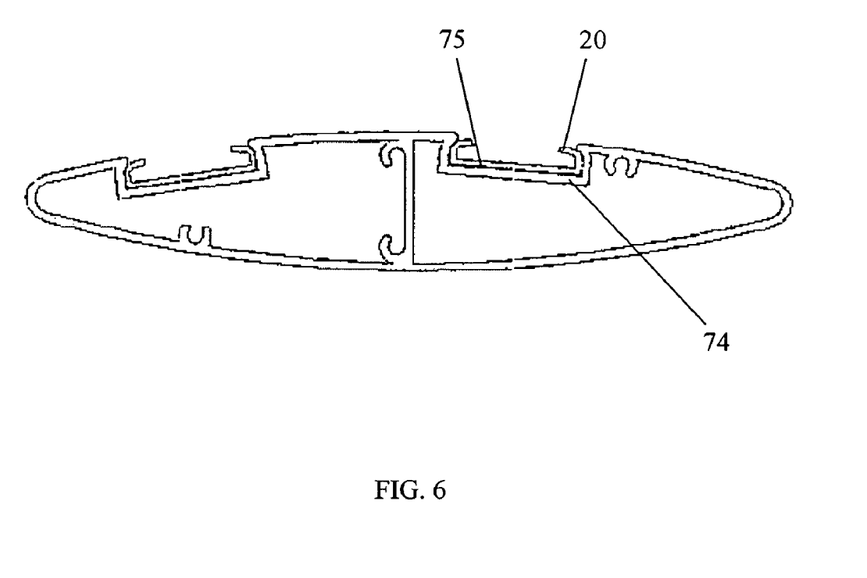
FIG. 6 shows a side view of the sun shade of FIG. 5.

FIG. 5 shows an isomeric view of a preferred form of sun shade 5, and FIG. 6 shows a side view of the sun shade of FIG. 5. The sun shade 5 includes a structural body or housing 70 with a top surface 72. The sun shade 5 has an elongate body to block sun light as discussed above. The sun shade is attached to the building to be protected in known fashion and may be provided with various components 71 to facilitate attachment. When attached, the sun shade 5 extends away from the building in a substantially perpendicular manner. Alternatively, the sun shade 5 may be at an acute or obtuse angle relative the building. One or more grooves 74 are provided within the top surface 72. The illustrated embodiment of FIGS. 5 and 6 contains two such grooves 74. These grooves 74 are dimensioned to snugly retain track 20 therein. With the track 20 in place, the building owner, architect, etc. can prevent birds and other creatures from roosting on or near the sun shade 5. The grooves 74 preferably are provided with a flat surface 75 to matingly correspond to the flat surface 26 of the track 20. This arrangement helps ensure there are no air gaps between the track 20 and the groove 74. The arcuate top surface of the anti-roosting device 1, including the electrical conductors 40, preferably is substantially flush with the sun shade top surface 72.

Figure 7:
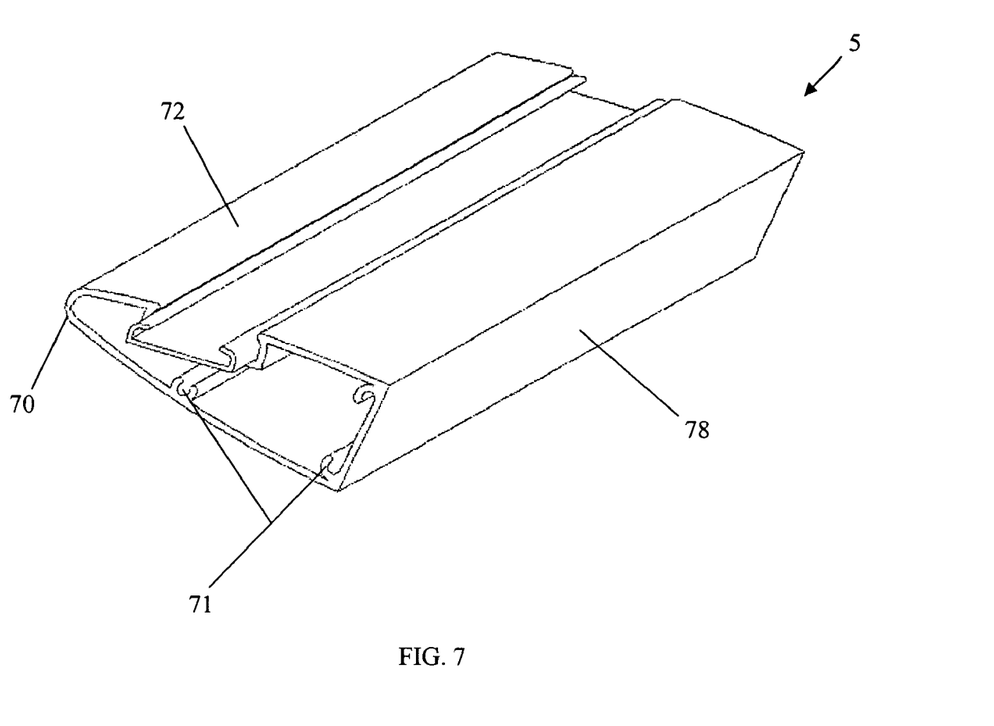
FIG. 7 shows an isomeric view of a preferred form of sun shade.
Figure 8:
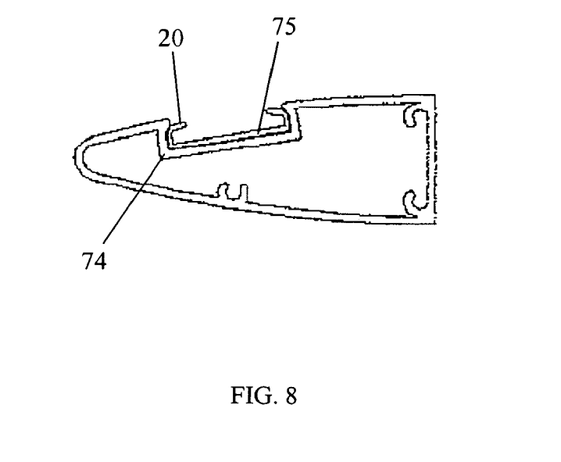
FIG. 8 shows a side view of the sun shade of FIG. 7.

FIG. 7 shows an isomeric view of another preferred form of sun shade 5, and FIG. 8 shows a side view of the sun shade of FIG. 7. The sun shade 5 of this embodiment is similar to the previously discussed embodiment, but the housing 70 additionally contains a flat surface 78 which may be useful in mounting the sun shade 5 in certain circumstances. This illustrated embodiment contains only one groove 74 and one track 20.

Figure 9:
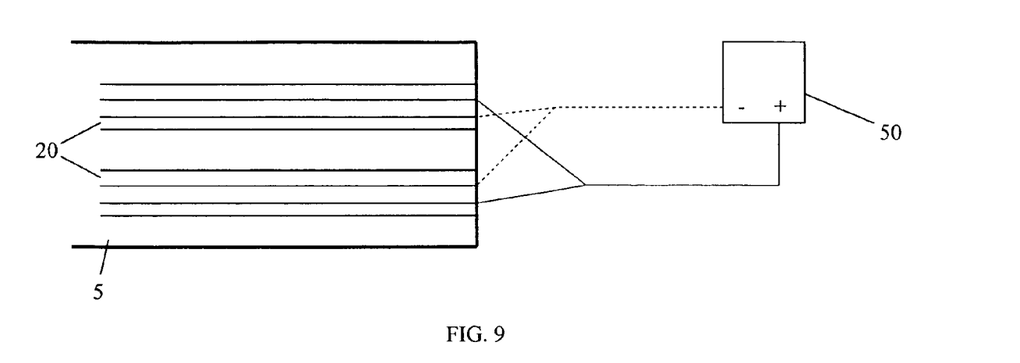
FIGS. 9-11 show exemplary wiring schemes for the anti-roosting device of the present invention.
Figure 10:
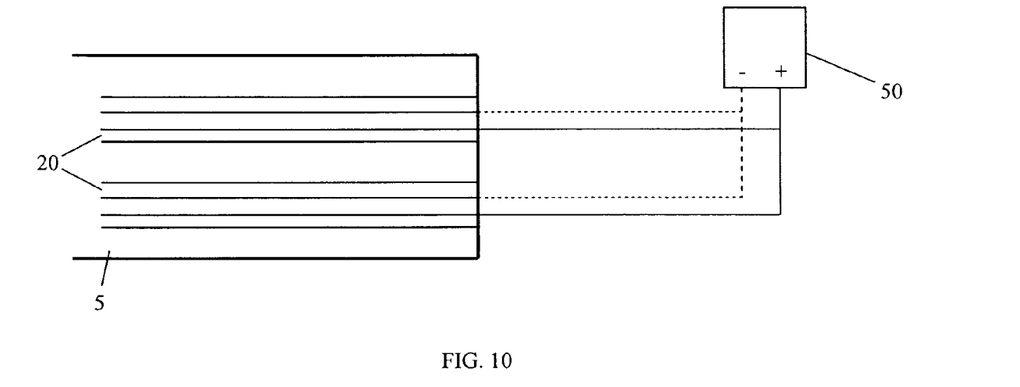
Figure 11:
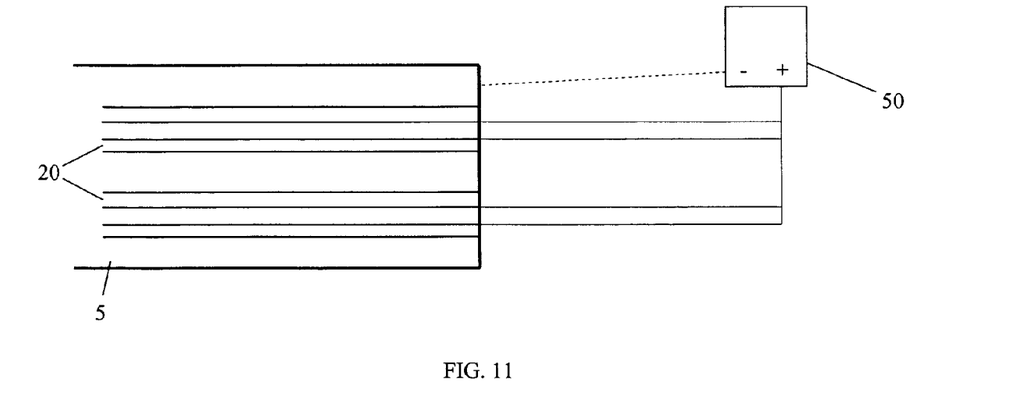

The body of the sun shade 5 may be made of virtually any desired material, such as plastic and/or aluminum. In a typical arrangement, for example when placing the track 20 on a building with stone ledges, the anti-roosting device 1 is wired using a positive and a negative connection to each track. This wiring scheme is illustrated in FIG. 9. A power source 50 provides electrical power to the system. The power source has positive and negative connections. For illustrative purposes, the leads to the negative connection are shown with dashed lines. Use of a metallic material for the body allows for additional wiring schemes. For example, the track 20 may be provided with only one electrical conductor 40 by using the shade body as the electrical ground. This wiring scheme, which is illustrated in FIG. 10, increases the effectiveness of the track by increasing the effective surface area. It is possible that the building itself may also be used as an electrical ground. Alternatively, the anti-roosting device may be wired using all positives and grounding out the surface, therefore increasing the effective surface area even more. This wiring scheme is illustrated in FIG. 11.

The sun shades 5 can be manufactured in a variety of ways known in the art. Extruding is a preferred manufacturing process to form the sun shades 5. The grooves 74 preferably are created during the formation of the sun shades. Alternatively, they may be created later by machining or other processes. The track 20 preferably is matched to have the same color as the sun shade 5. This makes the devices 1 virtually undetectable to the casual observer looking at the sun shades 5. The devices 1 may also be color-matched to the building or other structure with which they are being used. The device 1 may be coupled to the sun shade 1 simply by sliding it in the grooves 74 from the side (see FIGS. 6 and 8). The devices 1 may also be snapped into place from the top surface 72. The grooves 74 are created specifically for the purpose of holding and retaining the anti-roosting devices 1. The groove walls may be angled such that no other retention mechanism is required to keep the devices 1 in the desired position. One or more additional coupling mechanisms, however, such as adhesives, screws, rivets, and the like may also be used. The grooves 74 preferably are dimensioned such that the top of the devices 1, including the electrical conductors 40, are substantially flush with the sun shade top surface 72.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the invention has been described above in terms of preventing birds from roosting, it may equally be used to prevent other unwanted animals from roosting or inhabiting around the object or area being protected. Thus, the present invention should not be limited by the above-described exemplary embodiments, but should be defined only in accordance with the following claims and their equivalents.

What is claimed is:

1. An anti-roosting device, comprising:
    a structural body having an outer surface, with a groove provided in said outer surface;
    an elongate track formed of a non-conductive material and positioned within said groove;
    an electrical conductor at least partially embedded within an upper portion of an outer surface of said track; and
    an electrical source operatively coupled to said electrical conductor;
    wherein said elongate track extends substantially along an entire length of said electrical conductor.

2. The anti-roosting device of claim 1, wherein in the structural body is a sun shade, a ledge, or a fin.

3. The anti-roosting device of claim 1, wherein said electrical conductor includes a plurality of wires around a rope.

4. The anti-roosting device of claim 1, wherein said electrical conductor is generally circular in cross-section and has a diameter of approximately 0.125 inch to approximately 0.175 inch.

5. The anti-roosting device of claim 1, wherein said track includes a channel sized to substantially embed said electrical conductor while leaving a portion thereof exposed.

6. The anti-roosting device of claim 5, wherein said channel is sized to leave from approximately 1% to approximately 25% of said electrical conductor exposed.

7. The anti-roosting device of claim 5, wherein said track includes a second channel sized to substantially embed a second electrical conductor while leaving a portion thereof exposed.

8. The anti-roosting device of claim 5, wherein said track includes a flat side opposite said exposed electrical conductor for facilitating attachment of said track within said groove.

9. The anti-roosting device of claim 1, further comprising a second electrical conductor embedded within said track, said second electrical conductor including a plurality of wires around a rope.

10. The anti-roosting device of claim 9, wherein
    said electrical conductors are at least partially embedded within an upper surface of said track;
    said track includes a flat mounting surface opposite said upper surface; and
    said structural body includes a flat mounting surface corresponding to said track flat mounting surface.

11. The anti-roosting device of claim 10, wherein said track flat mounting surface extends at least underneath said electrical conductors.

12. The anti-roosting device of claim 10, wherein said track mounting surface and said structural body mounting surface are designed to eliminate air gaps between said track and said structural body.

13. The anti-roosting device of claim 10, wherein said track has a width; and said track mounting surface extends along a majority of said width.

14. The anti-roosting device of claim 1, wherein said electrical source provides approximately 3 to approximately 6 amps at approximately 4000 to approximately 8000 volts to said electrical conductor.

15. The anti-roosting device of claim 1, wherein said structural body is elongate and said groove is elongate.

16. The anti-roosting device of claim 15, wherein said structural body has a longitudinal axis and said track has a longitudinal axis that is substantially parallel to said structural body longitudinal axis.

17. The anti-roosting device of claim 1, wherein said electrical conductor includes copper.

18. An anti-roosting device, comprising:
    a structural body having an outer surface, with a groove provided in said outer surface;
    an elongate track formed of a non-conductive material and positioned within said groove, said track including a substantially flat mounting surface extending substantially along a width said track;
    an electrical conductor at least partially embedded within an upper portion of an outer surface of said track; and
    an electrical source operatively coupled to said electrical conductor;
    wherein said track further includes an arcuate surface opposite said mounting surface, said electrical conductor being embedded within a groove provided in said arcuate surface.

19. The anti-roosting device of claim 18, wherein said flat mounting surface extends at least underneath said electrical conductor.

20. The anti-roosting device of claim 18, further comprising a second electrical conductor at least partially embedded within an upper portion of said outer surface of said track, said arcuate surface extending between said electrical conductors.

21. An anti-roosting device, comprising:
    a structural body having an outer surface, with a groove provided in said outer surface;
    an elongate track formed of a non-conductive material and positioned within said groove;
    an electrical conductor at least partially embedded within an upper portion of an outer surface of said track; and
    an electrical source operatively coupled to said electrical conductor;

wherein said structural body is formed of an electrically conductive material, said electrical source being operatively coupled to said structural body.

22. The anti-roosting device of claim 21, wherein a positive lead of said electrical source is coupled to said electrical conducts and a negative lead of said electrical source is coupled to said structural body.

23. An anti-roosting device, comprising:
 a structural body having an outer surface, with a groove provided in said outer surface;
 an elongate track formed of a non-conductive material and positioned within said groove;
 an electrical conductor at least partially embedded within an upper portion of an outer surface of said track such that said electrical conductor is substantially flush with said upper surface of said structural body; and
 an electrical source operatively coupled to said electrical conductor.

* * * * *